Jan. 17, 1939.   L. E. LA BRIE   2,144,023
BRAKE
Filed Dec. 28, 1933   7 Sheets-Sheet 1
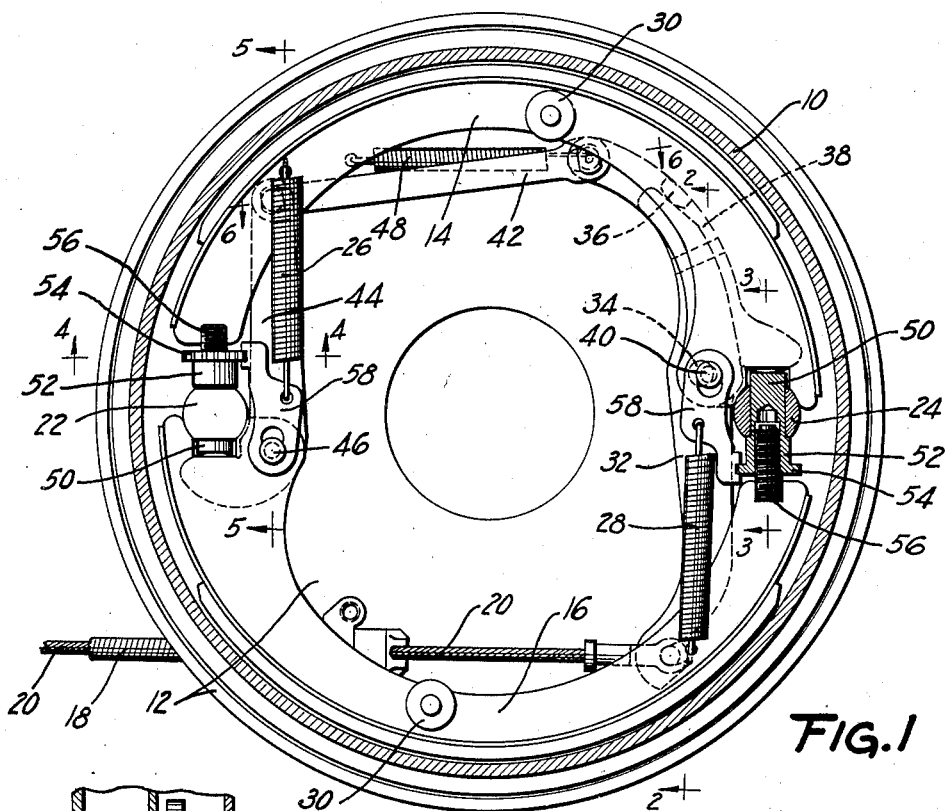
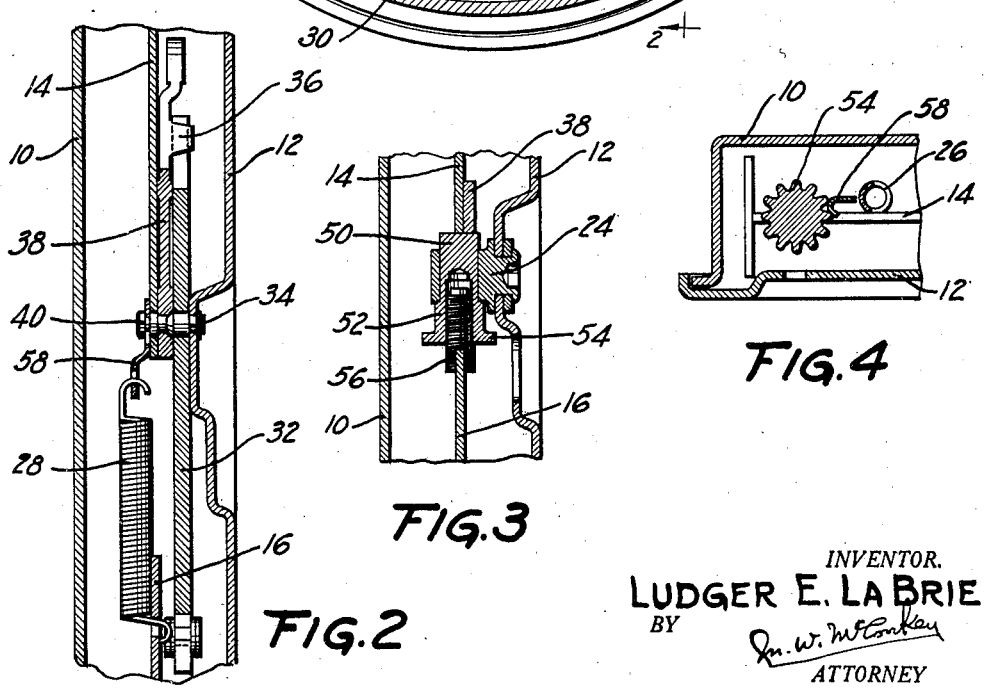
INVENTOR.
LUDGER E. LA BRIE
BY
*Jn. W. McConkey*
ATTORNEY Jan. 17, 1939.   L. E. LA BRIE   2,144,023
BRAKE
Filed Dec. 28, 1933   7 Sheets-Sheet 2
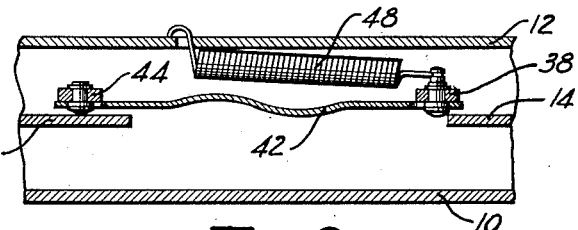
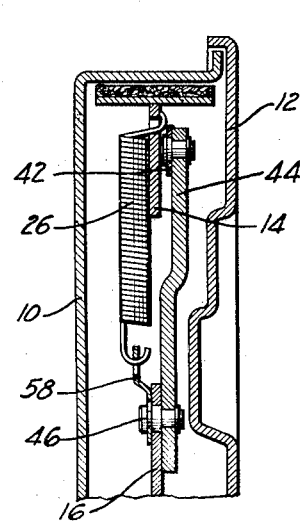
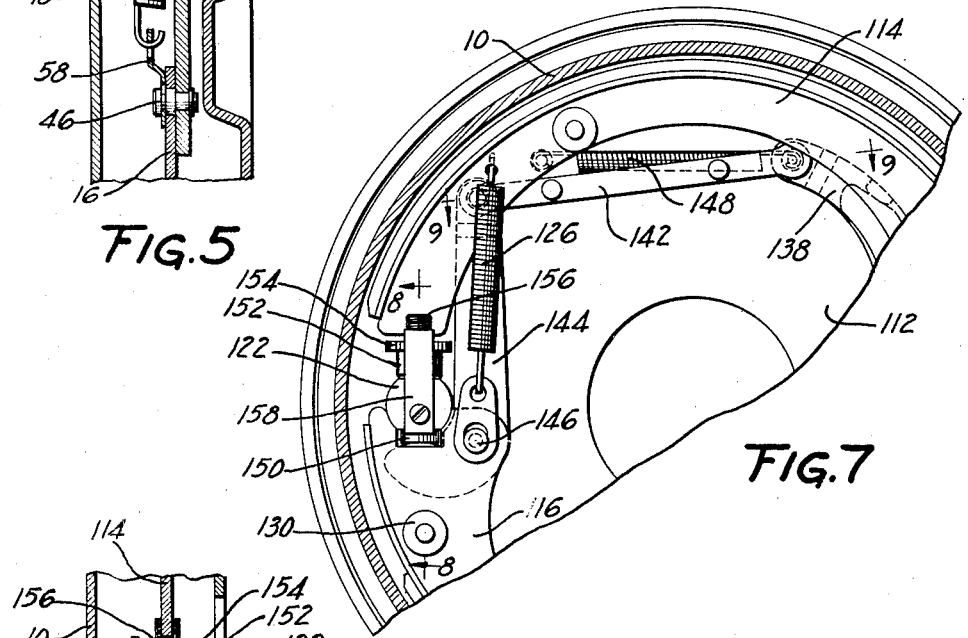
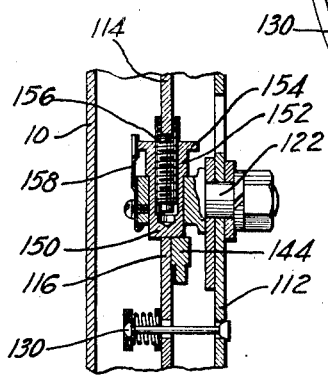
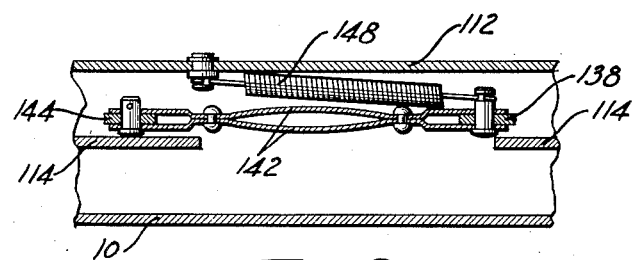
INVENTOR.
LUDGER E. LA BRIE
BY
ATTORNEY

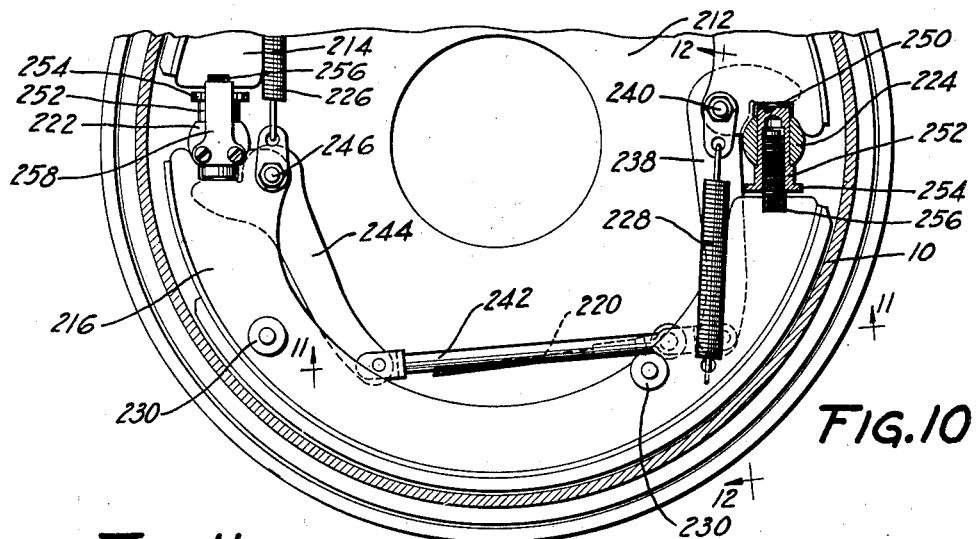
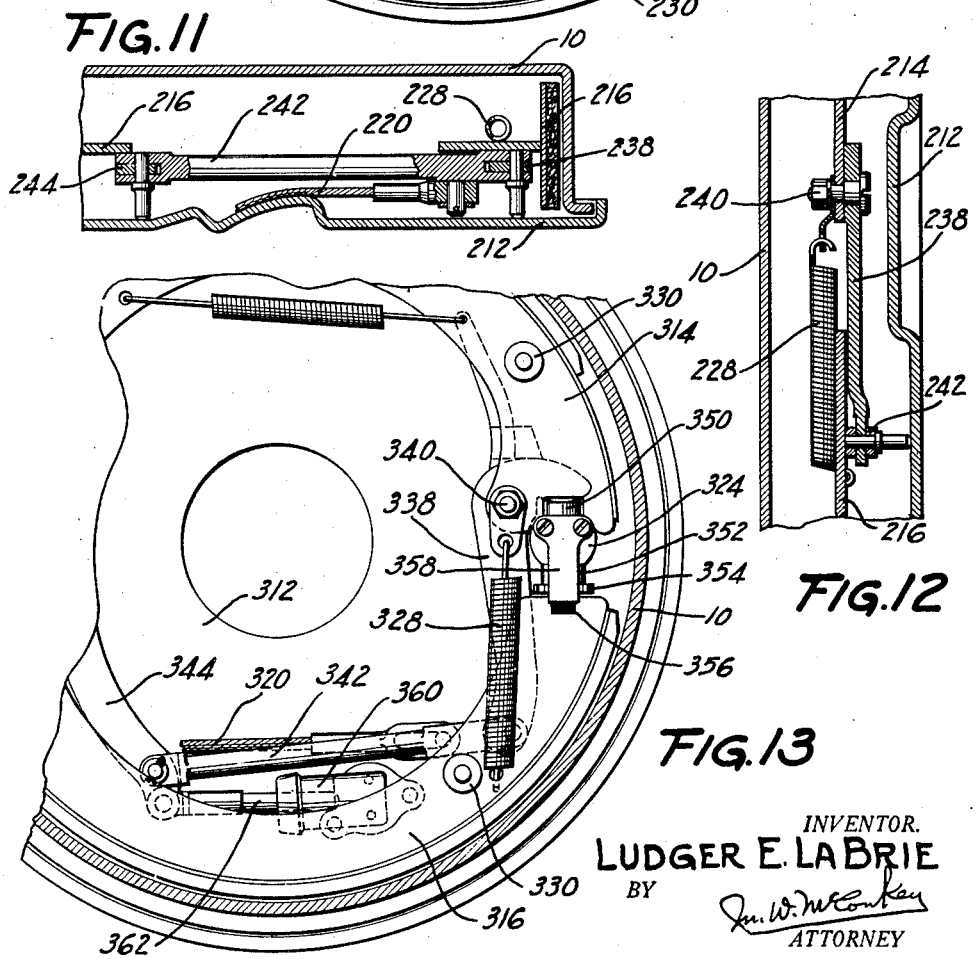

INVENTOR.
LUDGER E. LaBRIE
BY
ATTORNEY

Jan. 17, 1939.　　　L. E. LA BRIE　　　2,144,023
BRAKE
Filed Dec. 28, 1933　　　7 Sheets-Sheet 5

INVENTOR.
LUDGER E. LA BRIE
BY
ATTORNEY

Jan. 17, 1939.　　　　L. E. LA BRIE　　　　2,144,023
BRAKE
Filed Dec. 28, 1933　　　7 Sheets-Sheet 6
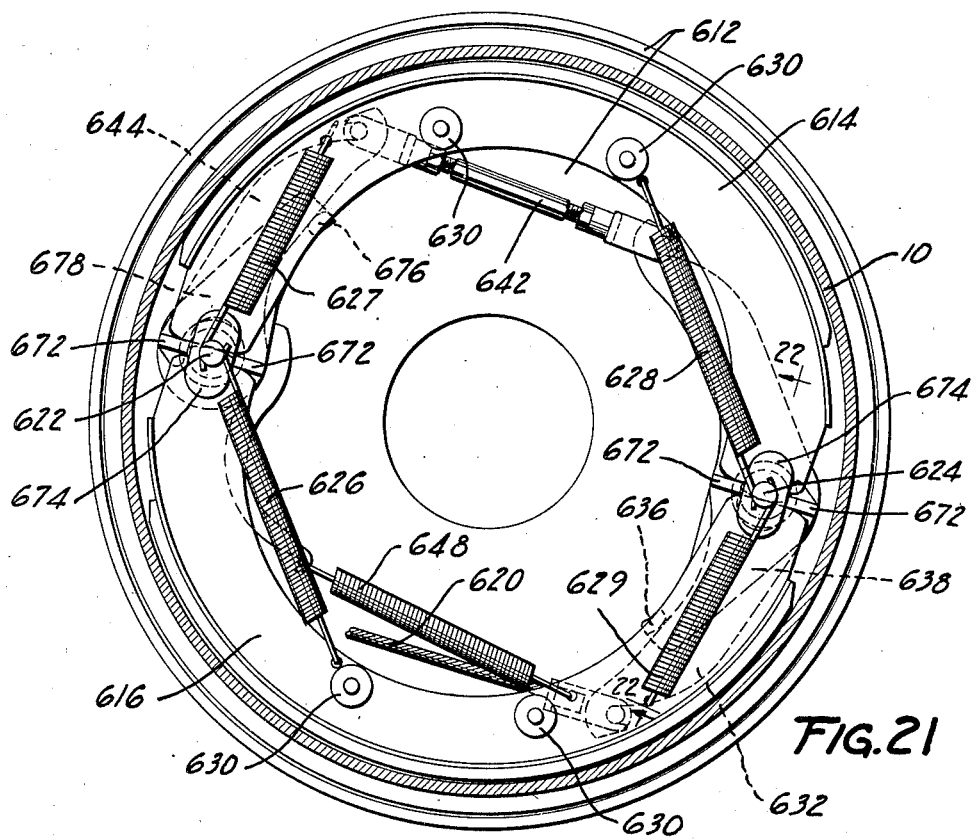
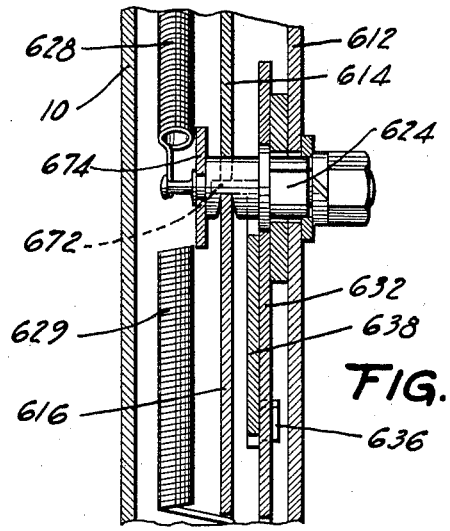
INVENTOR.
LUDGER E. LA BRIE
BY
ATTORNEY Jan. 17, 1939.  L. E. LA BRIE  2,144,023
BRAKE
Filed Dec. 28, 1933  7 Sheets-Sheet 7

INVENTOR.
LUDGER E. LA BRIE
BY
ATTORNEY

Patented Jan. 17, 1939

2,144,023

UNITED STATES PATENT OFFICE 2,144,023

BRAKE

Ludger E. La Brie, South Bend, Ind., assignor to Bendix Aviation Corporation, South Bend, Ind., a corporation of Delaware Application December 28, 1933, Serial No. 704,221

27 Claims. (Cl. 188—78)

This invention relates to brakes, and is illustrated as embodied in several different constructions of internal expanding brakes for automobiles and the like.

An object of the invention is to increase the power of brakes of this general type, by taking full advantage of the self-energizing effect of the brake shoes, while retaining full controllability by avoiding compounding the effect of one shoe on another, in a simple and effective and preferably fully-inclosed construction, and another object is to arrange such a construction for ready adjustment to compensate for wear.

The illustrated brakes are of the type in which there are two independent shoes, each of which anchors at one end when the drum is turning in one direction and at the other end when the drum is turning in the other direction, thus taking maximum advantage of the self-energizing effect of the shoes. The shoes are shown provided with fixed anchors at opposite sides of the brake between the ends of the shoes, and preferably mounted on a backing plate which cooperates with the brake drum to form a substantially closed chamber in which the brake is housed.

An important feature of the invention relates to the form and arrangement of the brake-operating means, and which preferably comprises a novel linkage housed inside the brake chamber and shown as swinging in a plane paralleling the brake plane, for example in the space between the backing plate and the webs of the shoes. I prefer to operate this novel linkage by a cable or other tension element which passes through the backing plate and through a flexible Bowden-type conduit supported at its ends on the backing plate and on the chassis frame and serving in effect, as a flexible extension of the brake chamber housing the part of the cable outside the backing plate. Thus the brake and its operating means are fully protected and housed all the way back to the frame.

In the illustrated embodiments of the invention, the novel linkage is shown as including a pair of floating levers at opposite sides of the brake, acting on the ends of the shoes adjacent the anchors, and connected by means such as a rigid floating link so that they swing in unison. I prefer to pivot each lever on the end of one of the shoes, and provide means such as a thrust connection extending from the lever to the end of the opposite shoe. This thrust connection extends past, and preferably through, the anchor and may have a shoulder engaging the face of the anchor opposite the lever and through which said other shoe anchors.

Another important feature of the invention relates to providing the above-described brake with a simple wear adjustment, for example by making the above-described connection through the anchor in two parts which are threaded together or otherwise adjustably connected. I prefer to form the part which is rotatably mounted in the opening in the anchor, and which has the shoulder seating against the anchor, with means such as a serrated flange by which it is turned to make the desired adjustment.

I also preferably provide means, several novel and desirable forms of which are shown, for yieldingly locking the flange or an equivalent part to preserve the adjustment so made.

Still another important feature of the invention relates to utilizing the above described mechanical operating means, or its equivalent, as the hookup connecting the brakes to the "emergency" hand lever for actuation thereby, the brakes being actuated alternatively as service brakes by hydraulic or other fluid means which preferably acts on the novel floating linkage described above.

In so arranging the brake, I prefer to have the mechanical actuator connected to one of the two floating levers and the hydraulic means to the other one, so that no matter what may break in case of an accident, there is still a fully effective operating means from either the service pedal or the hand lever all the way to the brake shoes.

For example, if one of the two floating levers breaks, while the other one acting alone (whether actuated by the service pedal or the hand lever) may not give quite as smooth and easy actuation of the brake it does nevertheless force both shoes against the drum and the brake is therefore still operative in stopping the car. While a well-designed operating system for four-wheel brakes rarely gives any trouble, I prefer to arrange it so that the brakes are effective and operable even when something does go wrong.

The above and other objects and features of the invention, including various novel combinations of parts and desirable particular constructions, will be apparent from the following description of the illustrative embodiments shown in the accompanying drawings, in which:

Figure 1 is a vertical section through the brake, just inside the head of the brake drum, and showing the brake shoes in side elevation;

Figure 2 is a partial section of the line 2—2 of Figure 1, showing part of the novel floating operating linkage;

Figure 14:
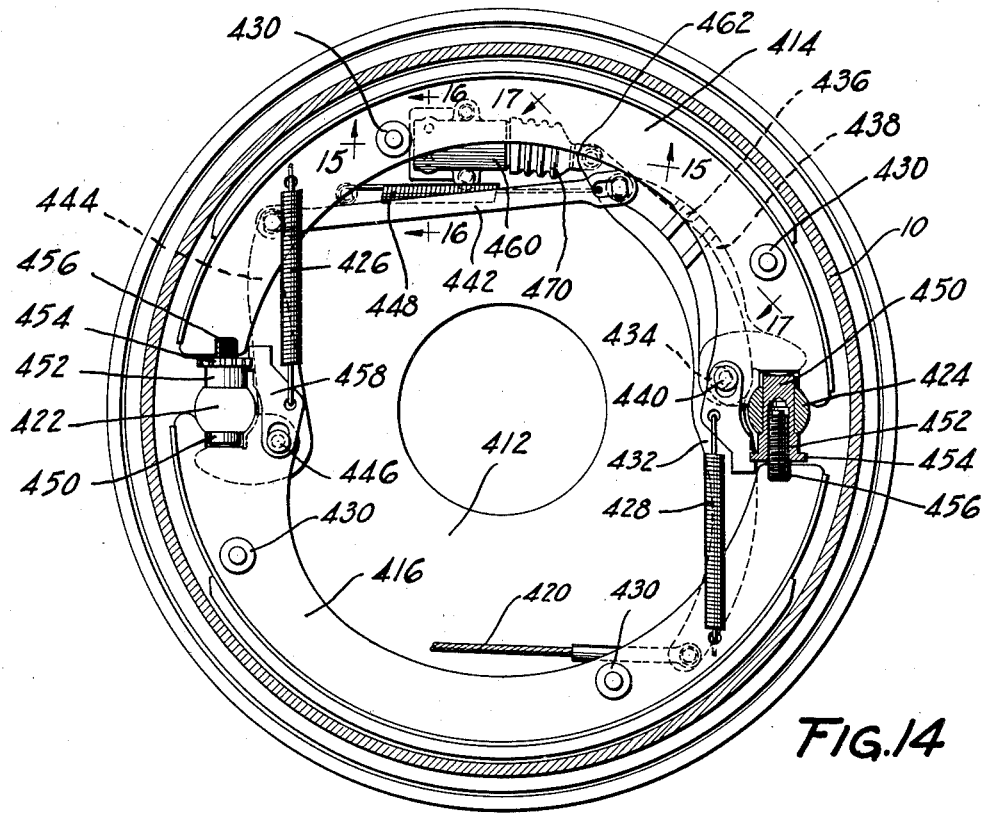
Figure 15:
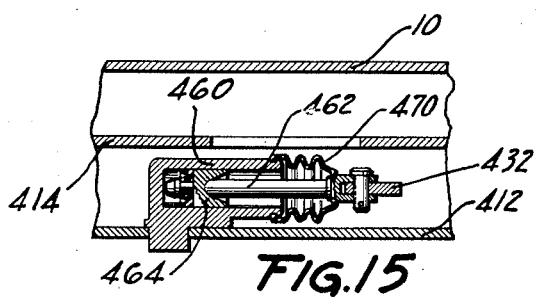
Figure 16:
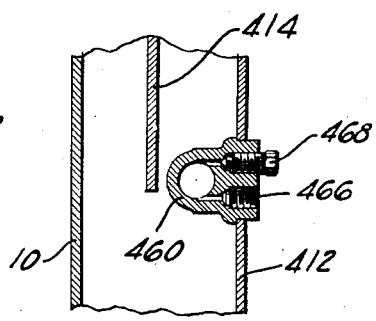
Figure 17:
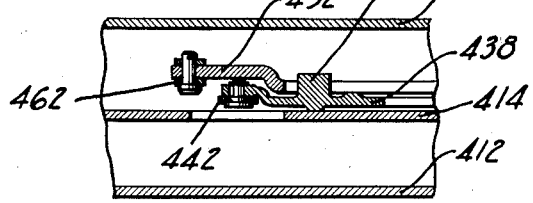
Figure 18:
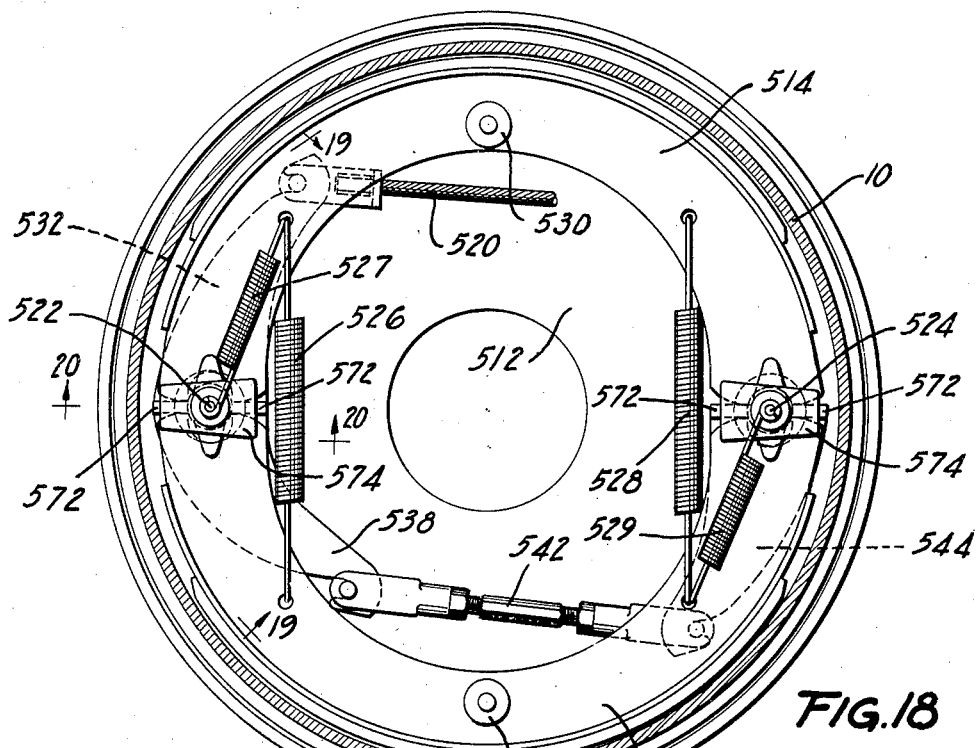
Figures 19, 20:
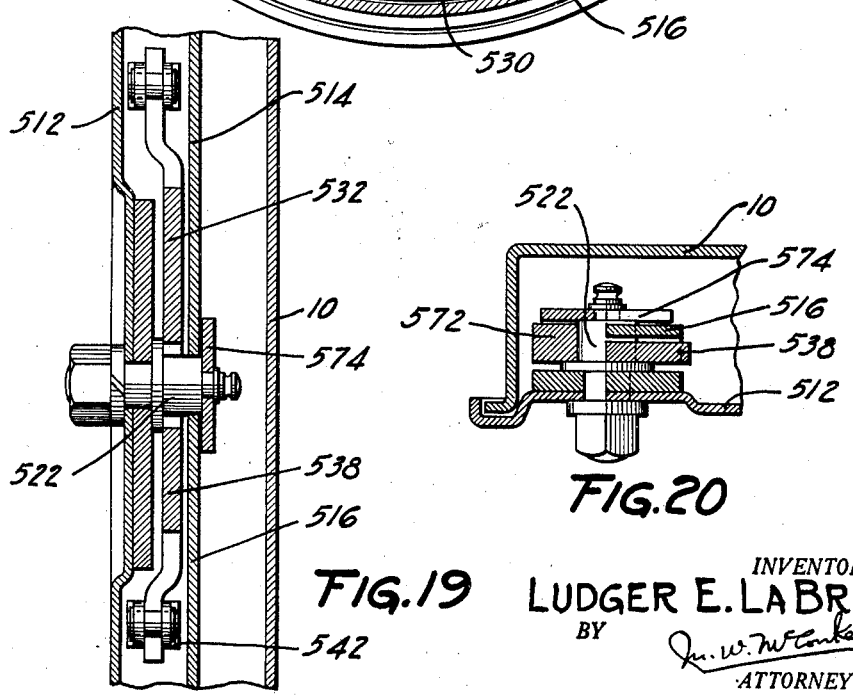
Figure 23:
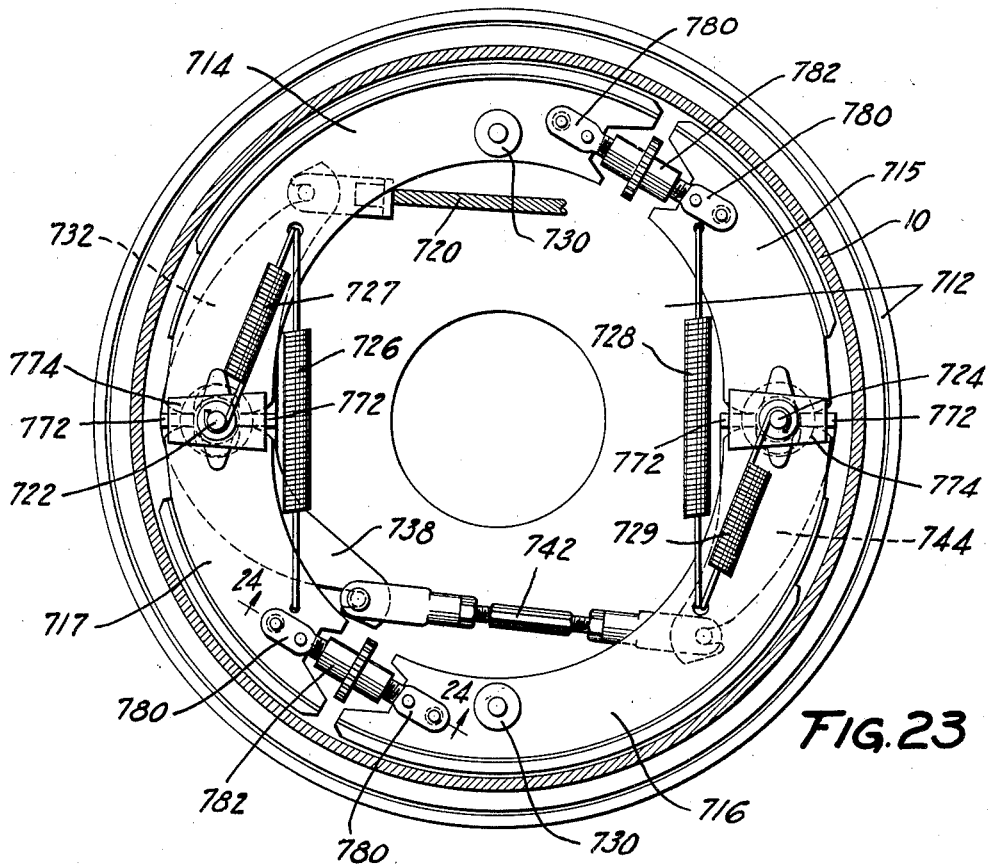
Figures 24, 25:
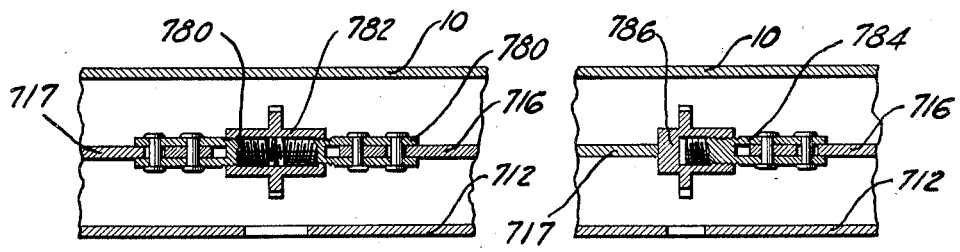

Figure 3 is a partial section through one of the brake anchors, on the line 3—3 of Figure 1;

Figure 4 is a partial section on the line 4—4 of Figure 1, showing the serrated flange of the adjusting member;

Figure 5 is a partial section on the line 5—5 of Figure 1, showing another of the levers forming part of the operating linkage;

Figure 6 is a partial section on the line 6—6 of Figure 1, showing the link connecting the two floating levers;

Figure 7 is a partial section corresponding to the upper and left-hand portion of Figure 1, but showing a second embodiment of the invention;

Figure 8 is a section through one of the anchors of Figure 7, on the line 8—8 of Figure 7;

Figure 9 is a partial section on the line 9—9 of Figure 7, showing the link connecting the two levers;

Figure 10 is a section corresponding to the lower portion of Figure 1, but showing a third embodiment;

Figure 11 is a partial section on the line 11—11 of Figure 10, showing the link connecting the two levers;

Figure 12 is a partial section on the line 12—12 of Figure 10, and showing one of the floating levers;

Figure 13 is a section corresponding to the central and right-hand portion of Figure 1, but showing a fourth embodiment;

Figure 14 is a section corresponding to Figure 1, but showing a fifth embodiment;

Figure 15 is a partial section on the line 15—15 of Figure 14, and showing one of the wheel cylinder assemblies forming part of the hydraulic operating system;

Figure 16 is a partial section through the wheel cylinder, on the line 16—16 of Figure 14;

Figure 17 is a partial section on the line 17—17 of Figure 14, and showing part of the operating linkage;

Figure 18 is a section corresponding to Figure 1, but showing a sixth embodiment;

Figure 19 is a partial section on the line 19—19 of Figure 18, and showing one anchor and a part of the operating linkage;

Figure 20 is a partial section on the line 20—20 of Figure 18, and showing one of the anchors;

Figure 21 is a section corresponding to Figure 1, and showing a seventh embodiment;

Figure 22 is a partial section on the line 22—22 of Figure 21, and showing one of the anchors;

Figure 23 is a section corresponding to Figure 1, and showing an eighth embodiment;

Figure 24 is a partial section on the line 24—24 of Figure 23, and showing the adjustable connection between the two parts of one of the shoes; and Figure 25 is a partial section corresponding to Figure 24 but showing an alternative adjustable connection between the two parts of the shoe.

The brake illustrated in Figures 1–6 includes a rotatable drum 10, at the open side of which is a suitable support such as a backing plate 12 of stamped steel. The drum and backing plate cooperate to form a substantially closed brake chamber housing the friction means of the brake, here shown as two T-section brake shoes 14 and 16 made by welding together stamped steel rims and webs.

The brake chamber so formed preferably has a flexible extension formed by a Bowden-type conduit 18 secured at its opposite ends to the backing plate 12 and to the chassis frame, and housing tension operating means such as a steel cable 20.

The brake arranged as shown in Figure 1, with the cable 20 leaving at the bottom of the brake, is intended for use at a rear wheel. For use on a front wheel the same brake is used, identical with that shown except for such changes in the backing plate 12 as are necessary to make it fit a front wheel knuckle, and except that the entire assembly is rotated 180° so that cable leaves at the top of the brake instead of at the bottom.

The braking torque of the shoes is taken by two anchors 22 and 24, carried by the backing plate and arranged between the ends of the shoes. When the drum is turning clockwise (with the vehicle moving backward) shoe 14 anchors on the anchor 24 and shoe 16 anchors on the anchor 22. When the drum is turning counterclockwise (with the vehicle moving forward), shoe 14 anchors on the anchor 22 and the shoe 16 on the anchor 24. Thus in either case both shoes have a full self-energizing action, without however any compounding of the action of the one shoe on that of the other.

The shoes are applied, against the resistance of return springs 26 and 28, by a novel operating linkage described below, and which is arranged in the space between the backing plate and the shoe webs and is operated by cable 20. The shoes are provided with suitable positioning means such as steady rests or the like 30.

The operating linkage, to which one feature of the invention relates, in the form shown in this embodiment, comprises a vertical operating lever 32 connected at its lower end to the cable 20 and mounted on a pivot 34 carried by the backing plate. Near its upper end the lever 32 engages a thrust lug 36 on a floating bell-crank operating lever 38 mounted on a pivot 40 carried by the end of the shoe 14 and approximately aligned with the pivot 34.

The upper end of the lever 38 is connected, by means such as a horizontal link 42, to the upper end of a second floating bell-crank lever 44 pivoted at 46 on the end of shoe 16 just below the anchor 22. A spring 48 attached to the upper end of the lever 38 and to the backing plate, urges both floating levers toward released position.

Each of the connected floating levers 38 and 44 has at its lower end a radial thrust part which engages connecting means acting on the other shoe and preferably passing through a vertical transverse cylindrical opening in the corresponding anchor. In both cases the connecting means includes a thrust part having a cylindrical smaller end 50 journaled in the opening in the anchor and integral with a larger portion 52 which forms a shoulder normally seated against the anchor and terminating in a serrated flange 54 adapted to be turned in adjusting the brake.

The thrust part has a threaded socket in its flanged end adjustably receiving a threaded thrust member 56 notched at its end to fit over and engage the end of the web of the opposite shoe. The end of the web of the shoe on which the lever is pivoted is shown cut away to afford sufficient clearance for the part 50. Each of the tensioned return springs 26 and 28 is shown attached to one of the shoes at one end, and at its other end to a pawl stamping 58 mounted on one of the pivots 40 or 46 and yieldingly engaging and locking the flange 54.

It will be seen that turning the flange 54 of one of the connecting devices described above, for example by inserting a tool through an opening in the backing plate, forces the corresponding thrust part 56 outwardly. This increases the effective length of the shoe engaged by the thrust member 56 to compensate for wear of the brake lining with which it is faced. It will be noted that this single adjustment adjusts both for anchorage and for the applying means. In spite of the fact that the two shoes shift individually in the operation of the brake, only the two simple adjustments are needed at each brake.

In operation, force applied through the cable 20 rocks the entire operating linkage described above, in a plane paralleling the plane of the brake and in the space between the backing plate and the shoe webs, to apply both shoes regardless of which ends of the shoes are anchored.

In each succeeding embodiment shown in the drawings, parts corresponding to those described above are designated by the same reference characters but with 100 or a multiple of 100 added.

The embodiment of Figures 7–9 differs from that described above principally in that the locking pawls 158 are mounted on the ends of the anchors, and in that the link 142 is made by riveting two stampings together so that it has two parts at each end, like a clevis. The parts of this brake not identical with those in Figure 1 are designated by reference characters 100 greater than the reference characters designating the corresponding parts in Figure 1.

In the modification of Figures 10–12, the lever 32 is omitted and the cable 220 is connected to a pin carried by the connecting link 242. In this case, also, the pivot pins at the ends of link 242 are extended into sliding supporting engagement with the backing plate. The other parts of this brake not identical with those in Figure 1 are designated by reference characters 200 greater than the reference characters designating the corresponding parts in Figure 1.

In Figure 13, the cable 320 is connected by a lost-motion slot to a pin on the link 342 immediately adjacent the end of the lever 338. In this case the cable 320 is intended to be operated from the usual emergency hand lever. The service pedal operates a hydraulic operating system which is connected to a wheel cylinder 360 mounted on the backing plate and containing an operating piston which actuates a compression link or strut 362 which is connected to the lever 344. The parts of this brake not identical with those in Figure 1 are designated by reference characters 300 greater than the reference characters designating the corresponding parts in Figure 1.

In Figure 14, the cable 420 is connected to the lower end of the lever 432 while the link 462 which is actuated hydraulically is connected to the upper end of the same lever. The cable operates in tension and the link in compression. Figure 15 also shows the piston 464 which operates the link or strut 462. Figure 16 shows the inlet port 466 through which the wheel cylinder is connected to the hydraulic line leading to the chassis, and a bleeder plug 468 which is removed in bleeding the brakes, as is sometimes necessary in hydraulic systems to remove air therefrom. The wheel cylinder may be sealed at its base by a boot or the like 470. The parts of this brake not identical with those in Figure 1 are designated by reference characters 400 greater than the reference characters designating the corresponding parts in Figure 1.

The embodiment of Figures 18–20 differs from those described above in that in place of a thrust device extending through an opening in the anchor, the floating levers have thrust lugs 572 extending between the ends of the shoe webs on opposite sides of the anchors, radially of the brake. The anchors serve as points of attachment for unbalancing springs 527 and 529 which prevent the anchored ends of the shoes from leaving the anchors in forward braking, and have means such as washers 574 for holding the shoes laterally. In this brake the link 542 is made like a turnbuckle so that it can be adjusted. The parts of this brake not identical with those in Figure 1 are designated by reference characters 500 greater than the reference characters designating the corresponding parts in Figure 1.

In Figure 21 the operating lever 632 connected to the cable 620 is pivoted on the anchor 624 and engages a thrust lug 636 on a floating lever 638 having lateral lugs 672 projecting between the ends of the shoe webs on opposite sides of the anchor 624, radially of the brake. The upper end of lever 632 is connected by means such as an adjustable turnbuckle link 642 to a lever 644 pivoted on the anchor 622. Lever 644 engages a lug 676 on a floating lever 678 constructed and arranged like the lever 638. The lever 676 is continued downwardly and attached to the end of the cable-returning spring 648, which thus serves also to return the lever 672 to idle or released position.

In this case there are four return springs 626, 627, 628, and 629, all connected to the brake anchors, springs 627 and 629 being stronger than springs 626 and 628 and serving as unbalancing springs. I prefer also in this embodiment, as best shown in Figure 22, to cut away the anchors at one side, so that in forward braking the shoes anchor against flat radial surfaces and can shift to adjust themselves. The parts of this brake not identical with those in Figure 1 are designated by reference characters 600 greater than the reference characters designating the corresponding parts in Figure 1.

In Figure 23, the cable 720 is connected to a lever 732 which is an integral extension of the floating lever 738, and the latter is connected by an adjustable turnbuckle link 742 to the other floating lever 744.

In this brake, the shoes are shown made in adjustably connected parts 714—715 and 716—717 respectively. In Figures 23 and 24, these parts have riveted rigidly thereto threaded stems 780 received in the opposite ends of a right-and-left threaded sleeve 782. The latter may have a serrated flange by which it is turned to make the adjustment.

If preferred, and as shown in Figure 25, there need be only one threaded stem 784 secured rigidly to the web of one of the shoe parts, and having adjustably threaded thereon a socketed thrust member 786 engaging the end of the web of the other shoe part, and shown formed with a serrated flange by which it is turned to make the adjustment. The parts of this brake not identical with those in Figure 1 are designated by reference characters 700 greater than the reference characters of the corresponding parts in Figure 1.

While several illustrative embodiments have been described in detail, it is not my intention to limit the scope of the invention to those particular embodiments, or otherwise than by the terms of the appended claims. It is not my intention to claim in the present application any of the subject-matter of my prior application No. 532,265, filed April 23, 1931, and divisions thereof.

I claim:

1. A brake comprising a drum and a backing plate arranged to form a substantially closed brake chamber, a pair of floating shoes within said chamber each having a web paralleling the backing plate, two anchors arranged between the ends of the shoes and carried by the backing plate at opposite sides of the brake, each anchor having an opening extending between the corresponding shoe ends, two generally parallel floating levers swinging parallel to the backing plate in the space between the backing plate and the shoe webs, one lever being pivoted on the end of one shoe at one side of the brake and the other being pivoted on the end of the other shoe at the other side of the brake, a connection between each lever passing through the opening in the corresponding anchor and including two adjustable-connected parts one of which engages the opposite shoe and the other of which has a shoulder for anchoring engagement with the anchor, and operating means connecting said levers and including a flexible tension element passing through the backing plate and a flexible conduit engaging the backing plate and housing the part of the tension element outside the backing plate and forming in effect a flexible extension of the brake chamber.

2. A brake comprising a drum and a backing plate arranged to form a substantially closed brake chamber, a pair of floating shoes within said chamber each having a web paralleling the backing plate, two anchors arranged between the ends of the shoes and carried by the backing plate at opposite sides of the brake, two generally parallel floating levers swinging parallel to the backing plate in the space between the backing plate and the shoe webs, one lever being pivoted on the end of one shoe at one side of the brake and the other being pivoted on the end of the other shoe at the other side of the brake, said levers having means extending past the anchors and acting on the opposite shoes, and operating means connecting said levers and including a flexible tension element passing through the backing plate and a flexible conduit engaging the backing plate and housing the part of the tension element outside the backing plate and forming in effect a flexible extension of the brake chamber.

3. A brake comprising a drum and a backing plate arranged to form a substantially closed brake chamber, a pair of floating shoes within said chamber each having a web paralleling the backing plate, two anchors arranged between the ends of the shoes and carried by the backing plate at opposite sides of the brake, each anchor having an opening extending between the corresponding shoe ends, two generally parallel floating levers swinging parallel to the backing plate in the space between the backing plate and the shoe webs, one lever being pivoted on the end of one shoe at one side of the brake and the other being pivoted on the end of the other shoe at the other side of the brake, a connection between each lever passing through the opening in the corresponding anchor and including two adjustably-connected parts one of which engages the opposite shoe and the other of which has a shoulder for anchoring engagement with the anchor, and operating means connecting said levers and operating them substantially simultaneously.

4. A brake comprising a drum and a backing plate arranged to form a substantially closed brake chamber, a pair of floating shoes within said chamber each having a web paralleling the backing plate, two anchors arranged between the ends of the shoes and carried by the backing plate at opposite sides of the brake, two generally parallel floating levers swinging parallel to the backing plate in the space between the backing plate and the shoe webs, one lever being pivoted on the end of one shoe at one side of the brake and the other being pivoted on the end of the other shoe at the other side of the brake, said levers having means extending past the anchors and acting on the opposite shoes, and operating means connecting said levers and operating them substantially simultaneously.

5. A brake having a backing plate and a pair of shoes mounted thereon, anchors carried by said plate at opposite sides of the brake and engaged by said shoes, an applying lever acting on the ends of said shoes adjacent each of said anchors and swinging in the space between the backing plate and the shoes, a rigid link connecting the ends of said levers and causing them to swing in unison to apply the two shoes, and means for rocking said connected levers to apply the brake.

6. A brake having a backing plate and a pair of shoes mounted thereon, anchors carried by said plate at opposite sides of the brake and arranged between the ends of said shoes, an applying lever acting on the ends of said shoes adjacent each of said anchors and swinging in the space between the backing plate and the shoes and which is pivoted on one shoe and has means extending past the corresponding anchor and engaging the other shoe, a rigid link connecting the ends of said levers and causing them to swing in unison to apply the two shoes, and means for rocking said connected levers to apply the brake.

7. A brake having a backing plate and a pair of shoes mounted thereon, anchors carried by said plate at opposite sides of the brake and arranged between the ends of said shoes, an applying lever acting on the ends of said shoes adjacent each of said anchors and swinging in the space between the backing plate and the shoes and which is pivoted on one shoe and has means extending past the corresponding anchor and engaging the other shoe, said means for each lever including adjustably-connected parts one of which is arranged to anchor one of the shoes against said corresponding anchor, a rigid link connecting the ends of said levers and causing them to swing in unison to apply the two shoes, and means for rocking said connected levers to apply the brake.

8. A brake having a backing plate and a pair of shoes mounted thereon, anchors carried by said plate at opposite sides of the brake and arranged between the ends of said shoes, an applying lever acting on the ends of said shoes adjacent each of said anchors and swinging in the space between the backing plate and the shoes and which is pivoted on one shoe and has means extending past the corresponding anchor and engaging the other shoe, said means for each lever including adjustably-connected parts extending through an opening in said corresponding anchor and one of which is arranged to anchor said other shoes against said corresponding anchor, a rigid link connecting the ends of said levers and causing them to swing in unison to apply the two shoes, and means for rocking said connected levers to apply the brake.

9. Brake applying and anchoring means for a pair of brake shoes comprising an anchor arranged between the ends of the shoes and formed with an opening, a lever pivoted on one of the shoes adjacent the anchor, said one of the shoes being arranged to anchor directly against the anchor, a thrust part engaged by said lever and extending through said opening and having a shoulder adapted for thrust engagement with the anchor on the side opposite the lever, and a thrust member adjustably connecting said part and the other one of said shoes.

10. Brake applying and anchoring means for a pair of brake shoes comprising an anchor arranged between the ends of the shoes and formed with an opening, a lever pivoted on one of the shoes adjacent the anchor, said one of the shoes being arranged to anchor directly against the anchor, a thrust part engaged by said lever and extending through said opening and having a shoulder adapted for thrust engagement with the anchor on the side opposite the lever, and a thrust member engaging the other of said shoes and adjustably threaded into said thrust part.

11. Brake applying and anchoring means for a pair of brake shoes comprising an anchor arranged between the ends of the shoes and formed with an opening, a lever pivoted on one of the shoes adjacent the anchor, said one of the shoes being arranged to anchor directly against the anchor, and a thrust part engaged by said lever and extending through said opening and having a shoulder adapted for thrust engagement with the anchor on the side opposite the lever and which is connected to the other of said shoes.

12. Brake applying and anchoring means for a pair of brake shoes comprising an anchor arranged between the ends of the shoes and formed with an opening, a lever pivoted on one of the shoes adjacent the anchor, said one of the shoes being arranged to anchor directly against the anchor, a thrust part engaged by said lever and extending through said opening and having a shoulder adapted for thrust engagement with the anchor on the side opposite the lever, and a thrust member engaging the other of said shoes and adjustably threaded into said thrust part, said thrust member having a notched end engaging and embracing the end of said other shoe and said thrust part being rotatable in said opening to force the thrust member away from the anchor to adjust for wear.

13. Brake applying and anchoring means for a pair of brake shoes comprising an anchor arranged between the ends of the shoes and formed with an opening, a lever pivoted on one of the shoes adjacent the anchor, said one of the shoes being arranged to anchor directly against the anchor, a thrust part engaged by said lever and extending through said opening and having a shoulder adapted for thrust engagement with the anchor on the side opposite the lever, a thrust member engaging the other of said shoes and adjustably threaded into said thrust part, said thrust member having a notched end engaging and embracing the end of said other shoe and said thrust part being rotatable in said opening to force the thrust member away from the anchor to adjust for wear, and a return spring for said shoes having means yieldingly resisting the turning of the thrust part.

14. Brake applying and anchoring means for a pair of brake shoes comprising an anchor arranged between the ends of the shoes and formed with an opening, a lever pivoted on one of the shoes adjacent the anchor, said one of the shoes being arranged to anchor directly against the anchor, a thrust part engaged by said lever and extending through said opening and having a shoulder adapted for thrust engagement with the anchor on the side opposite the lever, a thrust member engaging the other of said shoes and adjustably threaded into said thrust part, said thrust member having a notched end engaging and embracing the end of said other shoe and said thrust part being rotatable in said opening to force the thrust member away from the anchor to adjust for wear, a return spring connected to one of said shoes, and a pawl connected to the other shoe and to said spring and rocked by said spring into yielding engagement with the thrust part to hold it yieldingly against turning.

15. A thrust part for brake anchorage and applying means having a small-diameter cylindrical part adapted to be rotatably mounted in an opening in a brake anchor and having integral therewith a larger part forming a shoulder adapted for thrust engagement with said anchor and terminating in an operating and locking flange at the end opposite the cylindrical smaller part, and having a threaded socket extending into the flanged end.

16. A thrust part for brake anchorage and applying means having a small-diameter cylindrical part adapted to be rotatably mounted in an opening in a brake anchor and having integral therewith a larger part forming a shoulder adapted for thrust engagement with said anchor and terminating in a flange at the end opposite the cylindrical smaller part, and having a threaded socket extending into the flanged end.

17. A brake having two shoes, two anchors between the ends of the shoes and arranged at opposite sides of the brake, two bell-crank levers at opposite sides of the brake, each pivoted on the end of one shoe and having a radial thrust part which has associated therewith means extending past the corresponding anchor and acting on the other shoe and each having a lever arm extending past the anchor and beside the other shoe, means connecting said arm of one lever to the other lever, and operating means acting on said arm of the other lever.

18. A brake having two shoes, two anchors between the ends of the shoes and arranged at opposite sides of the brake, two bell-crank levers at opposite sides of the brake, each pivoted on the end of one shoe and having a radial thrust part which has associated therewith means extending past the corresponding anchor and acting on the other shoe and each having a lever arm extending past the anchor and beside the other shoe, and one having an auxiliary arm extending in the opposite direction, a link connecting said arm of the other lever to said auxiliary arm, and operating means acting on said arm of said other lever which has the auxiliary arm.

19. A brake having two shoes, two anchors between the ends of the shoes and arranged at opposite sides of the brake, two bell-crank levers at opposite sides of the brake, each pivoted on the end of one shoe and having a radial thrust part which has associated therewith means extending past the corresponding anchor and acting on the other shoe and each having a lever arm extending past the anchor and beside the other shoe, means connecting said arm of one lever to the other lever, and operating means acting on said arm of the other lever, said bell-crank levers and connections forming a linkage swinging in a plane beside said shoes.

20. A brake anchorage and applying means comprising an anchor formed with an opening therethrough, a thrust part rotatably mounted in said opening and having at one side of the anchor a flange provided with locking teeth, and a locking pawl mounted on the end of said anchor and yieldingly engaging said teeth.

21. A brake having applying means comprising two levers having a rigid connecting link adjacent their ends, a tension applying device acting adjacent the end of one lever and acting in compression through said link on the other lever, and another applying device alternatively acting on said other lever and acting in tension through said link on said one lever.

22. A brake having applying means comprising two levers having a rigid connecting link adjacent their ends, a mechanical applying device acting adjacent the end of one lever and acting in compression through said link on the other lever, and a hydraulic applying device acting on said other lever and acting in tension through said link on said one lever.

23. A brake comprising a drum and a backing plate inclosing between them friction means having, also inclosed between said drum and said backing plate, two floating levers at opposite sides of the brake and connected by a rigid link and swinging in unison in a plane paralleling the plane of the brake, the friction means being shiftable to anchor differently in opposite directions of drum rotation and the levers being shifted bodily by the friction means to compensate for the different anchorages thereof, and alternatively-operable mechanical and fluid applying devices operatively acting on said levers and link between the drum and backing plate for rocking said levers to apply the friction means against the drum.

24. A brake comprising two floating levers at opposite sides of the brake and connected by a rigid link and swinging in unison in a plane paralleling the plane of the brake, and alternatively-operable mechanical and fluid applying devices for rocking said levers, and one of which is connected to one lever and the other of which is connected to the other lever.

25. A brake comprising two shoes having two anchors between the ends of the shoes at opposite sides of the brake, a floating lever adjacent each anchor having thrust parts acting substantially equally on the adjacent shoe ends, an operating lever pivoted on each anchor and arranged to operate the corresponding floating lever, means connecting the two operating levers, and means for operating the operating levers.

26. A brake comprising a backing plate carrying two shoes and having two anchors between the ends of the shoes at opposite sides of the brake, a floating lever adjacent each anchor having thrust parts acting substantially equally on the adjacent shoe ends, an operating lever pivoted on each anchor and arranged to operate the corresponding floating lever, each floating lever and its corresponding operating lever being arranged in the space between the backing plate and one of the shoes, means connecting the two operating levers, and means passing through the backing plate for operating the operating levers.

27. A brake comprising a drum and backing plate forming an enclosure, and having within said enclosure brake friction means and actuating linkage therefor swinging in a plane paralleling the backing plate and including levers at opposite sides of the brake and a connection between said levers including a rigid link, in combination with a Bowden-type control for said brake including a conduit on the exterior of the backing plate and a cable extending through the conduit and through the backing plate at an acute angle and connected inside said enclosure to the actuating linkage.

LUDGER E. LA BRIE.